United States Patent Office 3,128,107
Patented Apr. 7, 1964

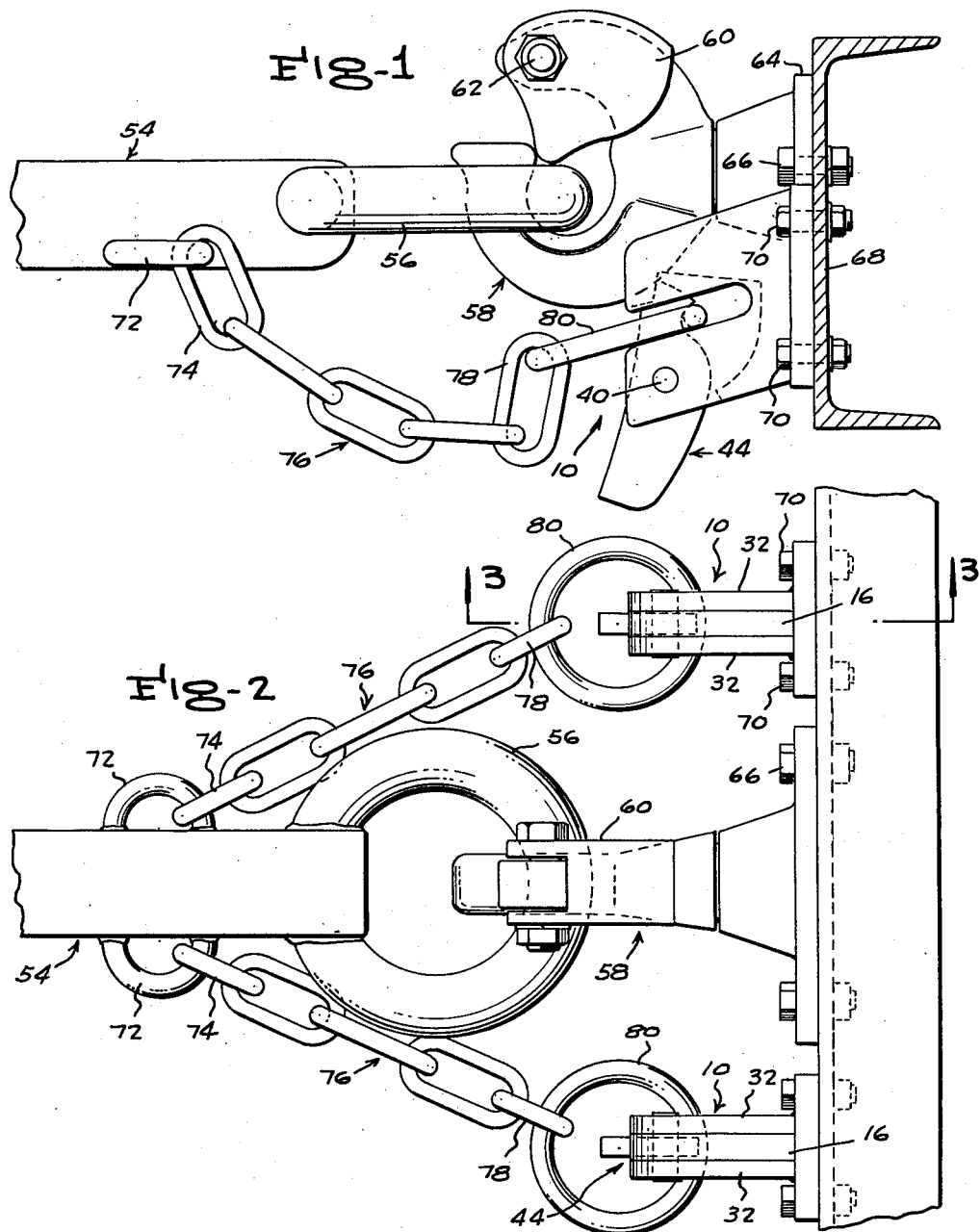

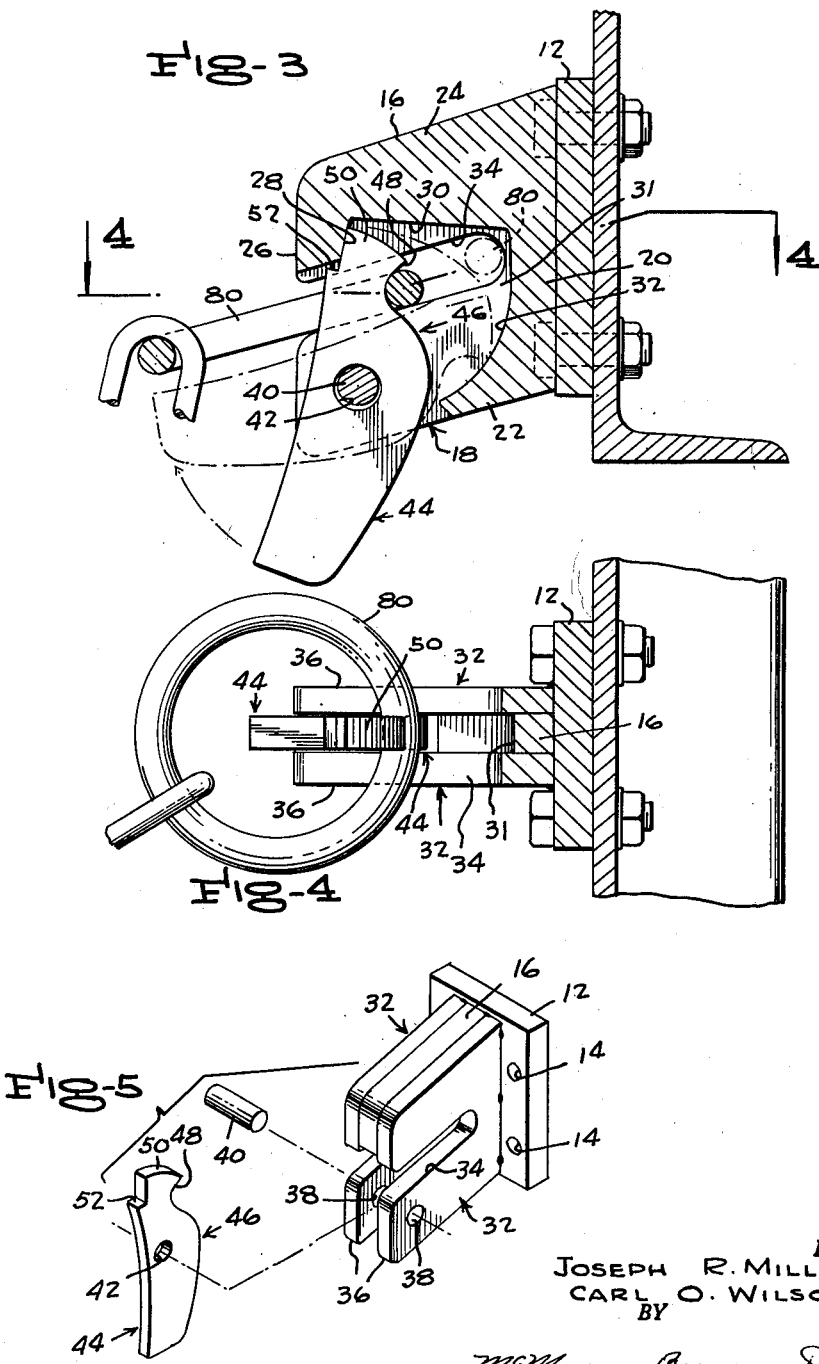

3,128,107
SAFETY CHAIN HITCH FOR TRAILER VEHICLES
Joseph R. Miller, 2638 N. 29th St., and Carl O. Wilson,
317 E. Roser Road, both of Phoenix, Ariz.
Filed Dec. 15, 1961, Ser. No. 159,666
5 Claims. (Cl. 280—457)

This invention relates to safety means, and more specifically, the instant invention pertains to an auxiliary coupling for preventing a trailer vehicle from breaking away from the towing vehicle in the event the main coupling means becomes inadvertently or accidentally disconnected.

One of the primary objects of this invention is to provide a safety chain auxiliary trailer hitch or coupling which will not interfere with the normal operation of the usual or conventional couplers between the towing vehicle and the trailer, and which becomes effective to prevent the separation thereof in the event the usual coupling means becomes disconnected or separated.

Another object of this invention is to provide a safety chain trailer hitch that may be easily installed on existing towing and towed vehicles without requiring alteration or radical changes therein.

A further object of this invention is to provide a safety chain trailer hitch having relatively few parts and which may be easily operated to move from its locked to its unlocked position.

This invention contemplates, as a still further object thereof, the provision of a safety chain hitch for trailer vehicles that is non-complex in construction and assembly, inexpensive to manufacture and maintain, and which is durable in use.

Other and further objects and advantages of the instant invention will become more evident from a consideration of the following specification when read in conjunction with the annexed drawings, in which:

FIGURE 1 is a side elevational view of a safety chain hitch constructed in accordance with this invention, the hitch being shown in its closed or locked position;

FIGURE 2 is a top plan view of the safety chain hitch shown in FIGURE 1;

FIGURE 3 is a detail, substantially medial cross-sectional view, FIGURE 3 being taken substantially on the vertical plane of line 3—3 of FIGURE 2, looking in the direction of the arrows, this figure showing in full lines the hitch in its closed or locked position and its open or unlocked position in dotted lines;

FIGURE 4 is a detail cross-sectional view of the hitch, FIGURE 4 being taken substantially on the line 4—4 of FIGURE 3, looking in the direction of the arrows; and FIGURE 5 is an exploded perspective view of the safety chain hitch according to this invention.

Referring now more specifically to the drawings, reference numeral 10 designates, in general, a safety chain hitch constructed in accordance with the teachings of this invention. While two such hitches are illustrated in FIGURE 2, both are identically constructed and, consequently, a description of one is also the description of the other.

Each hitch 10 includes a substantially rectangular base 12 through which transversely extend two pairs of bolt holes 14, the bolt holes 14 being preferably located along the marginal edges of the pair of opposed sides of the base 12.

Projecting laterally from the base 12 and rigidly secured thereto intermediate the two pairs of bolt holes 14 is a substantially rhomboidal keeper plate 16. The plate 16 includes a downwardly and outwardly-facing opening or pocket denoted in general by reference numeral 18. The opening 18 is defined by an inner end wall 20 integral with a lower end wall 22, and with an upper end wall 24 which overhangs and projects beyond the outer end of the lower end wall 22. The outer end of the upper end wall 24 terminates in a depending shoulder 26.

As is seen in FIGURE 3, the shoulder 26 has a downwardly and outwardly-inclined face 28, and the inner face 30 of the upper wall 24 is normally horizontal. The exposed outer face of the end wall 20 and the inner face of the lower wall 22 merge in a continuous arc 31.

A pair of identical substantially rhomboidal side plates 32 are disposed on opposite sides, respectively, of the keeper plate 16 in side-by-side position. The side plates 32 have their respective inner ends rigidly connected to the base 12, and an upwardly-inclined slot 34 extends integrally from each outer end of the side plates 32 for a major portion of the length thereof. The slots 34 bifurcate each of the plates 32 to form lower arms 36, each of which is provided with a transversely-extending aperture 38, the apertures 38 being aligned one with another.

Reference numeral 40 connotes a cylindrical pivot pin that extends between the plates 32 with its opposed ends being fixedly received in the apertures 38. The pivot pin 40 projects through an opening 42 formed in a manually-operable lever 44 above the center of gravity thereof, the opening 42 having a diameter greater than the diameter of the pin 40 so that a substantially loose connection is effected between the lever and pin to serve a function to be described, infra. The lever 44 is pivoted on the pin 40, as stated above, in an unbalanced condition, that is, the major end portion thereof extends below the pin 40 so that the lower end of the lever 44 constantly tends to turn downwardly or in a counterclockwise direction, as viewed in FIGURE 3, and the minor end portion projects into the opening or pocket 18, and the inner edge thereof has an ogee profile 46 of which the upper end 48 constitutes a cam surface or element. The inner end of the lever 44 terminates in a tongue 50 adapted to normally abut the shoulder 26 when the hitch is in its operable condition, the tongue 50 being notched or cutaway along the outer edge of the lever 44 to form a shoulder 52 in front of the tongue 50 to serve a function also to be described.

Reference numeral 54 indicates, in general, a towing vehicle draft bar having a coupler ring 56 rigidly secured thereto by conventional means. The ring 56 is adapted to be rigidly secured in a conventional upwardly-opening U-shaped coupler 58 having the usual lock-down member 60 pivotally connected at 62 thereon. The coupler 58 includes a base 64 that is bolted at 66 to the front chassis frame member 68 of a trailer (not shown) centrally of the longitudinally-opposed ends thereof.

As is seen in FIGURE 2, the bases 12 of the two safety chain hitches 10 are connected by bolts 70 to the chassis frame member 68 on opposite sides of the primary coupler 58.

Welded or otherwise secured to the draft bar 54 adjacent its outer end is a pair of arcuate connectors 72, the connectors being disposed on opposite sides of the bar 54. Connected to each of the connectors 72, respectively, is an end link 74 on a pair of link chains 76. At the opposite ends of the chains 76, the terminal links 78 connect with O or ring shaped links 80.

FIGURES 1 and 3 are now specifically referred to in order to demonstrate the utility of the hitch 10. In FIGURE 1, the coupler ring 56 is shown connected to the primary coupler 58 and positioned under the lock-down member 60. None of these elements form any part of the instant invention, including the draft bar 54, for the same are conventional in the trailer hitch art.

The O-rings 80 (see FIGURE 2) are normally locked behind the cam element 48 with the tongue 50 abutting the face 28 of the shoulder 26. In this position, the shoulder 52 is disposed below and in close proximity to the lower end of the shoulder 26.

Let it now be assumed that through inadvertence or accident, the coupler ring 56 becomes disconnected from the coupler member 58, while the towing vehicle and trailer are in motion. This would normally lead to the separation of the two vehicles and could result in both personal injury and property damage. However, the safety hitches 10 and chains 76 prevent the disconnection and reduce to a minimum any tendency of the trailer vehicle to sway from side-to-side inasmuch as the chains 76 straighten out from their normally inoperative positions shown in FIGURES 1 and 2 and, under tension now applied thereto, form a substantially rigid connection between the draft bar 54 and the front chassis frame member 68. It is to be understood, of course, that the chains 76 are each of substantially the same length. Under these conditions, the chain tension on the O-ring 80 forces the tongue 50 into engagement with the shoulder 26, the forces being directed so as to tend to turn the lever 44 counterclockwise, as viewed in FIGURE 3.

To uncouple the rings 80 from their respective hitches 10, it is only necessary to slack off the tension on each of the chains 76 and to rotate the lever 44 in a clockwise direction, reference being made to FIGURE 3 of the drawings. This movement forces the ring 80 to move upwardly on the cam element 48 as the lever pivots about the pin 40. Specifically, the initial movement of the lever 44 is one of a shifting type with respect to the pin 40, this movement being permitted due to the over-sized opening 42. The shifting causes the shoulder 52 to abut the shoulder 26 as an initial fulcrum.

Referring to FIGURE 3 of the drawings, as the lever 44 is pivoted in a clockwise direction, the cam element 48 exerts a force having an inclined downward vertical factor causing the link 80 to ride upwardly on the cam element 48 toward the tongue 50. As the lever continues its rotation in the aforesaid direction, the link 80 escapes from the cam element 48 and begins to ride on the tongue 50. During the time that this motion takes place, the link 80 is moved to the dotted-line position shown in FIGURE 8, and remains in this position until the link 80 has passed the upper end of the tongue 50 at which point the weight of the links 80 forming the safety chain will cause that link 80 disposed within the hitch to ride over the tongue 50 and shoulder 52 to escape from the hitch. Thus, it should no be manifest that it is the shape of the cam surface 48 that effects the disengagement of the link 80 as the lever 44 is pivoted.

Now, since the ring 80, in its original locked position in the cam element 48 extends laterally through both of the side plates 32 in the confronting slots 34, as soon as the tongue 50 and the shoulder 52 move below the lower edges of the slots 34, the ring 80 is freed to move outwardly therefrom. As soon as the ring 80 is removed from the hitch 10, the lever 44 pivots in a counterclockwise direction to take up the full-line position shown in FIGURE 3.

In order to connect the ring 80 with the hitch 10 it is only necessary for the user to insert the ring 80 between the slots 34 formed in the side plates 32 and force the same against the upper end of the lever 44, causing the tongue 50 and the shoulder 52 to pivot below the lower edge of the slot 34 so that the tongue 50 may escape from beneath the ring 80 when the latter reaches substantially the innermost ends of the slots 34. At this time, the lever 44 will again pivot in a counterclockwise direction, causing re-engagement of the tongue 50 against the shoulder 52, and as tension is applied on the chain 76, the link will move downwardly in the slots 34 to engage in the cam element 48 in the manner shown in the drawings.

Having described and illustrated one embodiment of this invention in detail, it will be understood that the same is offered merely by way of example, and the scope of this invention is to be limited only by the appended claims.

What is claimed is:

1. A safety chain hitch for connecting the draft bar of a towing vehicle with a frame member of a trailer, said hitch comprising a base fixedly secured to said frame member, a keeper plate having an inner end thereof fixedly secured to said base and projecting laterally therefrom, said keeper plate having a downwardly and outwardly-facing opening formed therein, a pair of side plates fixedly secured to said base and disposed on opposite sides of said keeper plate, said side plates each having a slot formed therein extending from the outer end thereof, said slots registering with said opening, a pivot pin extending between said side plates and having its opposed ends fixedly secured thereon below said slots, an elongated lever pivotally mounted on said pin, said lever having an end portion extending into and substantially closing said opening and extending transversely across said slots, said lever being pivotally mounted in an unbalanced condition to constantly urge said end portion thereof for movement across said slots, abutment means on said keeper plate disposed in the path of movement of said end portion, said abutment means limiting said movement of said end portion of said lever, said lever being loosely mounted on said pin, said lever having an ogee profile at its said end to provide a cam element confronting said opening and normally registering with said slots, said cam element and said slots normally receiving a locking link of a safety chain therein, and said lever being pivotal away from said abutment to clear said slots and to disengage said link from said cam element for removal of said link from said hitch through said slots.

2. A safety chain hitch for a trailer comprising a substantially rectangular base adapted for fixed connection to an element of said trailer, a pair of laterally-spaced substantially rhomboidal side plates having opposed inner and outer ends, said inner ends being fixedly secured to said base with said plates being disposed in laterally-spaced and substantially parallel relation, each of said plates having a slot extending inwardly from said outer end thereof, said slots being parallel to each other, a keeper plate having a substantially rhomboidal configuration, said keeper plate having opposed inner and outer ends, said keeper plate being disposed between said side plates with said inner end rigidly connected with said base, said keeper plate having a downwardly and outwardly-facing opening formed therein and a depending shoulder extending partially across said opening, a pivot pin extending transversely between and being supported on said side plates, said pivot pin extending through said opening below said slots, an elongated lever loosely and pivotally supported on said pin in unbalanced condition and being pivotal toward said base, said lever having a tongue confronting said opening, a fulcrum shoulder formed on the front of said tongue and initially engageable against said first shoulder when said lever is pivoted toward said base, said tongue having an ogee profile along the rear surface thereof and having an end thereof terminating in a cam element, said cam element normally registering with said slots and said tongue extending transversely thereacross, said slots and said cam element receiving a chain link therethrough, and said pivotal movement of said lever toward said base being effective to clear said slots and consequently force said link out of engagement with said cam element for subsequent removal from said hitch through said slots.

3. A safety chain hitch for a trailer as defined in claim 2, wherein said keeper plate opening includes an inner end wall, a bottom wall integral therewith, and a top wall integral therewith, said top wall overhanging and projecting beyond said bottom wall, said top wall including said depending shoulder, said last-named shoulder having a downwardly and outwardly-extending face adapted to be contacted by said tongue, said top wall having a normally horizontal face, and said inner end wall and said bottom wall having a continuous arcuately-shaped inner faces.

4. An article of manufacture comprising a safety chain hitch for a trailer, said hitch comprising a base adapted for connection with said trailer, a substantially rhomboidal keeper plate having a downwardly and forwardly extending opening formed therein, said keeper plate having a depending shoulder closing a part of said opening, a side plate disposed on each side of said keeper plate and rigidly secured to said base, said plates being disposed in side-by-side relation, each of said side plates having a downwardly and forwardly-extending elongated slot formed therein confronting said opening, said chain having a link receivable within said slots, a pivot pin being disposed below said slots and extending between and secured to said side plates below said shoulder, a lever pivotally mounted on said pin and having an end thereof projecting upwardly into said opening and engageable with said link and normally abutting said shoulder, and said lever normally extending across and substantially closing said opening.

5. An article of manufacture comprising a safety chain trailer hitch:
   (a) said hitch including a base adapted for connection with said trailer;
   (b) a substantially rhomboidal keeper plate fixedly secured to said base and projecting laterally therefrom;
   (c) said keeper plate having a downwardly and forwardly-facing opening formed therein;
   (d) said keeper plate having a depending shoulder at its outer end partially closing said opening;
   (e) a pair of side plates fixedly secured to said base and projecting laterally therefrom on opposite sides of said keeper plate;
   (f) said plates each having a slot formed therein extending from the outer end thereof, said slots confronting one another and communicating with said opening;
   (g) a pivot pin extending between and having its opposed ends supported on said side plates;
   (h) a lever loosely supported for pivotal movement on said pin;
   (i) said lever substantially closing said opening and having a terminal tongue disposed in said opening and normally engaging against said shoulder to limit the pivotal movement thereof out of said opening;
   (j) a cam element formed in said tongue and confronting said opening, said cam element normally registering with said slots;
   (k) said cam element being adapted to releasably receive therein a link of said safety chain whereby tension on said chain causes said link to effect a turning force in one direction on said lever causing said tongue to abut said shoulder and to hold said link against disengagement with said cam element; and
   (l) said lever being pivotal in the opposite direction to force said link out of said cam element for escape over said tongue and removal from said hitch as said tongue clears said slots.

References Cited in the file of this patent
UNITED STATES PATENTS

| | | |
|---|---|---|
| 406,188 | Andress | July 2, 1889 |
| 648,429 | Peterson | May 1, 1900 |
| 2,394,207 | Roth | Feb. 5, 1946 |
| 2,872,717 | Kelley | Feb. 10, 1959 |